United States Patent
Kuta et al.

(10) Patent No.: US 12,160,409 B2
(45) Date of Patent: Dec. 3, 2024

(54) SYSTEM AND METHOD FOR ANONYMIZATION OF A FACE IN AN IMAGE

(71) Applicant: DE-IDENTIFICATION LTD., Tel Aviv (IL)

(72) Inventors: Eliran Kuta, Tel Aviv (IL); Sella Blondheim, Tel Aviv (IL); Gil Perry, Tel Aviv (IL); Yoav Hacohen, Jerusalem (IL)

(73) Assignee: DE-IDENTIFICATION LTD., Tel Aviv (IL)

( * ) Notice: Subject to any disclaimer, the term of this patent is extended or adjusted under 35 U.S.C. 154(b) by 417 days.

(21) Appl. No.: 17/676,157

(22) Filed: Feb. 20, 2022

(65) Prior Publication Data
US 2022/0172517 A1    Jun. 2, 2022

Related U.S. Application Data

(63) Continuation of application No. PCT/IL2020/050907, filed on Aug. 19, 2020.
(Continued)

(51) Int. Cl.
*H04L 9/40* (2022.01)
*G06N 3/08* (2023.01)
(Continued)

(52) U.S. Cl.
CPC .......... *H04L 63/0421* (2013.01); *G06N 3/08* (2013.01); *G06V 10/764* (2022.01);
(Continued)

(58) Field of Classification Search
CPC ... H04L 63/0421; H04L 63/0861; G06N 3/08; G06N 3/045; G06N 3/088; G06V 10/764;
(Continued)

(56) References Cited

U.S. PATENT DOCUMENTS

| | | |
|---|---|---|
| 6,278,791 B1 | 8/2001 | Honsinger et al. |
| 8,270,718 B2 | 9/2012 | Drory et al. |

(Continued)

FOREIGN PATENT DOCUMENTS

| | | |
|---|---|---|
| EP | 3451209 | 3/2019 |
| KR | 102123248 | 6/2020 |

(Continued)

OTHER PUBLICATIONS

De-Identification, Li et al, Feb. 2019 (Year: 2019).*
(Continued)

*Primary Examiner* — Jianxun Yang
(74) *Attorney, Agent, or Firm* — PEARL COHEN ZEDEK LATZER BARATZ LLP

(57) ABSTRACT

A system and method of anonymization of a face in a set of images by at least one processor, the method including: receiving a first set of images; extracting from the first set of images a first face, depicting a person and having a first set of attributes; and performing a perturbation of the first face to produce a second face having a second set of attributes, wherein the second set of attributes is adapted to be visually perceived by a viewing entity as being substantially equivalent to the first set of attributes, and wherein the second face is adapted to be visually perceived by a viewing entity as not pertaining to the depicted person.

18 Claims, 7 Drawing Sheets

Related U.S. Application Data

(60) Provisional application No. 62/888,844, filed on Aug. 19, 2019.

(51) Int. Cl.
*G06V 10/764* (2022.01)
*G06V 10/774* (2022.01)
*G06V 10/82* (2022.01)
*G06V 40/16* (2022.01)

(52) U.S. Cl.
CPC ............ *G06V 10/774* (2022.01); *G06V 10/82* (2022.01); *G06V 40/16* (2022.01); *G06V 40/162* (2022.01); *G06V 40/171* (2022.01); *G06V 40/172* (2022.01)

(58) Field of Classification Search
CPC ...... G06V 10/774; G06V 10/82; G06V 40/16; G06V 40/162; G06V 40/171; G06V 40/172; G06T 11/60
See application file for complete search history.

(56) References Cited

U.S. PATENT DOCUMENTS

| | | |
|---|---|---|
| 9,105,119 B2 | 8/2015 | Whitehill et al. |
| 2007/0236513 A1 | 10/2007 | Hedenstroem et al. |
| 2010/0074525 A1 | 3/2010 | Drory et al. |
| 2011/0123118 A1 | 5/2011 | Nayar et al. |
| 2012/0177248 A1 | 7/2012 | Shuster |
| 2012/0288166 A1 | 11/2012 | Sun et al. |
| 2014/0328547 A1 | 11/2014 | Whitehill et al. |
| 2015/0261995 A1 | 9/2015 | Hudgins |
| 2015/0324633 A1 | 11/2015 | Whitehill et al. |
| 2017/0301121 A1 | 10/2017 | Whitehill et al. |
| 2017/0302661 A1 | 10/2017 | Connell, II et al. |
| 2019/0080440 A1* | 3/2019 | Eriksson ............ G06N 5/00 |
| 2019/0188562 A1 | 6/2019 | Edwards et al. |
| 2019/0238568 A1 | 8/2019 | Goswami et al. |
| 2019/0332850 A1 | 10/2019 | Sharma et al. |
| 2020/0097767 A1 | 3/2020 | Perry et al. |

FOREIGN PATENT DOCUMENTS

| | | |
|---|---|---|
| MX | 2014015326 | 3/2018 |
| WO | WO 2015/039084 | 3/2015 |
| WO | WO 2015/039086 | 3/2015 |
| WO | WO 2016/107651 | 7/2016 |
| WO | WO 2018/225061 | 12/2018 |
| WO | WO 2019/014487 | 1/2019 |

OTHER PUBLICATIONS

Search Report of International Application No. PCT/IL2020/050907 mailed on Nov. 30, 2020.
Perez et al. "Face recognition and De-Identification in the frequency domain", Dec. 31, 2016.
He, Z., Zuo, W., Kan, M., Shan, S., & Chen, X; Attgan: Facial attribute editing by only changing what you, Jul. 25, 2018.
Jourabloo et al. "Attribute preserved face de-identification" 2015 International Conference on Biometrics ICB), Phuket, 2015, pp. 278-285.
European Search Report of Application No. 18813726.9 mailed on Feb. 8, 2021.
Brkic Karla et al; I know that Person; Generative Full Body and Face De-Identification of People in Images; University of Zagreb, Faculty of Engineering and Computing, HR-1000 Zagreb, Croatia Mireo d.d., HR-1000 Zagreb, Croatia, 2017.
Olah, Chris, et al. "The building blocks of interpretability." Distill 3.3 (2018): e10.
Chi et al; "Facial Image De-Identification using Identity Subspace Decomposition" 2014 IEEE International Conference on Acoustics, Speech and Signal Processing (ICASSP), Florence, 2014, pp. 524-528.
Muraki et al; Anonymizing Face Images by Using Similarity-Based Metric; 2013 International Conference on Availability, Reliability and Security, Regensburg, 2013, pp. 517-524.
Search Report of International Application No. PCT/IL2019/050993 mailed on Dec. 31, 2019.
Sendik et al; What's in a face? Metric Learning for Face Characterization, Eurographics 2019; vol. 38 (2019) No. 2.
Zhu et al; Face Detection, Pose Estimation, and Landmark Localization in the Wild, Dept. of Computer Science, University of California, Irvine.
Du et al; GARP-Face: Balancing Privacy Protection and Utility Preservation in Face De-identification, IEEE International Joint Conference on Biometrics, Clearwater, FL, 2014, pp. 1-8.
Yang, Shuo, et al. "Wider face: A face detection benchmark." Proceedings of the IEEE conference on computer vision and pattern recognition. 2016.
Kingma, Diederik P., and Jimmy Lei Ba. "Adam: A Method for Stochastic Optimization." (2015). ICLR 2015.
Akhtar, Naveed, and Ajmal Mian. "Threat of adversarial attacks on deep learning in computer vision: A survey." IEEE Access 6 (2018): 14410-14430.
Gross et al; Multi-PIE; Published in final edited form as Proc. Int Conf Autom Face Gesture Recognit; May 1, 2010; 28 (5); 807-813.
Carlini, Nicholas, and David Wagner. "Towards evaluating the robustness of neural networks." 2017 IEEE Symposium on Security and Privacy (SP). IEEE, 2017.
Baluja, Shumeet, and Ian Fischer. "Adversarial transformation networks: Learning to generate adversarial examples." arXiv preprint arXiv:1703.09387 (2017).
Bitouk et al; "Face Swapping: Automatically Replacing Faces in Photographs" ACM Trans. Graph. 27, 3, Aug. 2008, pp. 1-8.
Dr Lily Meng; Face De-identification for Privacy Protection; http:/go.herts.ac.uk/lily_meng; University of Hertfordshire United Kingdom; Training School 2017; Second Cost IC1206 Training School.
Driessen et al. "Achieving Anonymity Against Major Face Recognition Algorithms" In: De Decker B., Dittmann J., Kraetzer C., Vielhauer C. (eds) Communications and Multimedia Security. CMS 2013. Lecture Notes in Computer Science, vol. 8099. pp. 18-33, Springer, Berlin, Heidelberg.
Das, Nilaksh, et al. "Keeping the bad guys out: Protecting and vaccinating deep learning with jpeg compression." arXiv preprint arXiv:1705.02900 (2017).
Le, Vuong, et al. "Interactive facial feature localization." European conference on computer vision. Springer, Berlin, Heidelberg, 2012.
Phillips, P. Jonathon, et al. "Overview of the face recognition grand challenge." 2005 IEEE computer society conference on computer vision and pattern recognition (CVPR'05). vol. 1. IEEE, 2005.
Dziugaite, Gintare Karolina, Zoubin Ghahramani, and Daniel M. Roy. "A study of the effect of jpg compression on adversarial images." arXiv preprint arXiv:1608.00853 (2016).
Esteva, Andre. "Dermatologist-level classification of skin cancer with deep neural networks. Enhancing the Expert." Stanford University. Slide Presentation. Jun. 8, 2017. URL: https://pdfs.semanticscholar.org/0d0e/e35c1b05868c1bc9494a202dce4b7f414370.pdf.
Messer, Kieron, et al. "XM2VTSDB: The extended M2VTS database." Second international conference on audio and video-based biometric person authentication. vol. 964.1999.
Schmidhuber, Jurgen. "Deep Learning in Neural Networks: An Overview." arXiv preprint arXiv: 1404.7828 (2014).
Girshick, Ross. "Fast r-cnn." Proceedings of the IEEE international conference on computer vision. 2015.
Girshick, Ross, et al. "Rich feature hierarchies for accurate object detection and semantic segmentation." Proceedings of the IEEE conference on computer vision and pattern recognition. 2014.
Deng, Jia, et al. "Imagenet: A large-scale hierarchical image database." 2009 IEEE Conference on Computer Vision and Pattern Recognition, Miami, FL, 2009, pp. 248-255.
Szegedy, Christian, et al. "Intriguing properties of neural networks." arXiv preprint arXiv:1312.6199 (2013).

(56) References Cited

OTHER PUBLICATIONS

Moosavi-Dezfooli, Seyed-Mohsen, Alhussein Fawzi, and Pascal Frossard. "Deepfool: a simple and accurate method to fool deep neural networks." Proceedings of the IEEE Conference on Computer Vision and Pattern Recognition. 2016.
Xie, Cihang, et al. "Adversarial examples for semantic segmentation and object detection." Proceedings of the IEEE International Conference on Computer Vision. 2017.
Papernot, Nicolas, et al. "Practical black-box attacks against machine learning." Proceedings of the 2017 ACM on Asia Conference on Computer and Communications Security. ACM, 2017.
Papernot, Nicolas, et al. "The limitations of deep learning in adversarial settings." 2016 IEEE European Symposium on Security and Privacy (EuroS&P). IEEE, 2016.
Csaji, Balazs Csanad. "Approximation with artificial neural networks." Faculty of Sciences, Etvs Lornd University, Hungary 24 (2001): 48.
Belhumeur, Peter N., et al. "Localizing parts of faces using a consensus of exemplars." IEEE transactions on pattern analysis and machine intelligence 35.12 (2013): 2930-2940.
Simonyan, Karen, and Andrew Zisserman. "Very deep convolutional networks for large-scale image recognition." arXiv preprint arXiv:1409.1556 (2015).
Goodfellow, Ian J., Jonathon Shlens, and Christian Szegedy. "Explaining and harnessing adversarial examples." arXiv preprint arXiv:1412.6572 (2015).
H. Chi and Y. H. Hu, "Face de-identification using facial identity preserving features," *2015 IEEE Global Conference on Signal and Information Processing (GlobalSIP)*, 2015, pp. 586-590, doi: 10.1109/GlobalSIP 2015.7418263.
Gross et al. "Face De-Identification" In: Senior A. (eds) Protecting Privacy in Video Surveillance. pp 129-146, Springer, London.
Bla/v; Meden et al "Face Deidentificaiton with Generative Deep Neural Networks", Jul. 28.
Yuezun Li et al; "De-identification without losing faces", Feb. 12, 2019.
Liang Du et al "Garp-Face; Balancing Privacy Protection and Utility Preservation in Face De-identification" IEEE International Joint COnference on Biometrics, Clearwater, FL, 2014, pp. 1-8.
Newton EM, Sweeney L, Malin B Preserving privacy by de-identifying facial images. IEEE transactions on Knowledge and Date Engineering, Jan. 10, 2005; 17 (2) 232-43.
Ren, Zhongzheng; Lee, Yong Jae: Ryoo Learning to Anonymize Faces for Privacy Preserving Action Detection. Eprint arXiv: 1803.11556, Jul. 26, 2018.
Letournel, Geoffrey; Bugeau, Aur, Lie; TA Vinh-Thong; Domenger, Jean Philippe Face De-identification with Expressions Preservations, International Conference on Image Processing (ICIP) Sep. 2015.
Justus Thies et al; "Face2Face; Real-time Face Capture and Reenactment of RGB Videos" CVPR2016, Jul. 29, 2020.
Naruniec et al "High-Resolution Neural Face Swapping for Visual Effects" vol. 39 No. 4 (2020).
Hyeongwoo Kim et al "Deep Video Portraits" ACM Transactions on Graphics (TOG) vol. 37, No. 4, May 29, 2018.
Thies et al "Deferred Neural Rendering: Image Synthesis using Neural Textur" Apr. 28, 2019.
Thies et al "Neural Voice Puppetry: Audio-driven Facial Reenactment" arXiv prepring arXiv: 191205566 Dec. 11, 2019.
Fried et al "Text-based editing of talking-head video" ACM Transactions on Graphics vol. 38 Issue 4 Article No. 69, pp. 1-14, Jul. 4, 2019.
European Search Report of Application No. 20854071.6 mailed on Aug. 14, 2023.
Muraki, Tomonari et al; "Controlling Tradeoff between Security and Usability in Anonymizing Face Images", Security Management, Jan. 25, 2015, vol. 28, No. 3 pp. 3-16.

\* cited by examiner

S1005: Extracting, or segmenting from a first set of images a first face, depicting a person and having a first set of attributes.

S1010: Perturbating the first face to produce a second face having a second set of attributes, wherein the second set of attributes is adapted to be perceived, by an attribute classifier, as substantially equivalent to the first set of attributes, and wherein the second face is adapted to be visually perceived by a viewing entity as not pertaining to the depicted person.

Fig. 7

SYSTEM AND METHOD FOR ANONYMIZATION OF A FACE IN AN IMAGE

CROSS-REFERENCE TO RELATED APPLICATIONS

This application is a continuation in part of PCT Application No. PCT/IL2020/050907 filed Aug. 19, 2020, which claims the benefit of Provisional U.S. Patent Application No. 62/888,844, filed Aug. 19, 2019 each of which is hereby incorporated by reference in its entirety.

FIELD OF THE INVENTION

The present invention relates generally to image processing. More specifically, the present invention relates to anonymization of a face in an image.

BACKGROUND OF THE INVENTION

The abundance of cameras an image recorders in modern life surroundings is evident. For example, autonomous cars may take video recordings of the surrounding view. Such view would inevitably include people's faces and may thus include Personal Identifiable Information (PII), which may not be in compliance with modern Privacy by Design (PbD) methodologies and Privacy regulations such as General Data Protection Regulation (GDPR).

In many cases, the attributes of facial images are of commercial value, as businesses may, for example, be interested in knowing some features or attributes of people who enter their premises. Such attributes may include, for example these people's age, gender, ethnicity, mood, etc.

In certain scenarios, a person's gaze may also provide valuable information. Extracting such information from PII may be prohibited as a form of processing personal information for the purpose of profiling, which may not be permitted without prior written consent. GDPR regulations may not be completely clear in regard to whether there is a distinction between profiling of a specific person and performing statistical profiling of a plurality of people, while ignoring their individual identities. Thus, profiling could be a problem even in the case where recordings are deleted immediately after extracting facial and emotional attributes and even more so in the case where recordings are stored for a relatively long time after extracting the necessary data.

Traditional methods of facial anonymization may include detecting faces in an image, and substitute them with white blobs, blur them or pixelate them. For example, such methods may be implemented for anonymizing faces in a photo or a video. However, this method may negatively impact the effectiveness of extraction of important information from the recording.

SUMMARY OF THE INVENTION

Accordingly, a system and a method for anonymization of faces in an image or a set of images such that attributes of the original face would be preserved or maintained is required.

Embodiments of the invention may include a method and system for anonymizing a face in a set of images by at least one processor. Embodiments of the method may include extracting, from a first set of images a first face, depicting a person and having a first set of attributes; and perturbating the first face to produce a second face having a second set of attributes. The second set of attributes may be adapted to be perceived, by an attribute classifier, as substantially equivalent to the first set of attributes, and the second face may be adapted to be visually perceived by a viewing entity as not pertaining to the depicted person.

Embodiments of the method may further include blending a background of the first set of images with the second face to produce a second set of images.

According to some embodiments of the invention, the viewing entity may be, or may include: a perceptual similarity metric module, a human vision similarity predictor; a face recognition classifier, and feedback from a human viewer.

According to some embodiments of the invention, the attributes of the first set of attributes and second set of attributes may be, or may include, for example, facial attributes, positioning attributes and accessory attributes. Facial attributes of the first face and second face may include, for example an age, a gender, an ethnicity, an emotion, an expression, a complexion, an eye color, and the like. Positioning attributes of the first face and second face may include, for example, a position of a face, an orientation of a face, a pose of a face, an elevation of a face, and the like. The accessory attributes of the first face and second face may include, for example, existence of spectacles on a face, existence of jewelry on the face, existence of hair dressing accessories on the face, and the like.

According to some embodiments of the invention, perturbating the first face may include, in a training stage, using a labeled training set of images depicting faces, to train a machine-learning (ML) based face generator module, so as to produce a respective set of perturbated faces. Additionally, or alternatively, perturbating the first face may include, in an inference stage, extracting the first face and producing a perturbated face from the extracted first face based on the training of the ML-based face generator module.

According to some embodiments of the invention, training the ML-based face generator module may include: receiving at least one labeled image of a face, pertaining to the labeled training set of images, as a first input; receiving at least one output indication of an attribute classifier as a second input; receiving at least one output indication of a viewing entity as a third input; and training the ML-based face generator module based on said inputs, to produce a perturbated face. The perturbated face may include one or more attributes, perceived by the attribute classifier as substantially equivalent to one or more respective attributes of the face of the labeled image. The perturbated face may be visually perceived by the viewing entity as not pertaining to the same person as the face of the labeled image.

According to some embodiments of the invention, producing a second face may include: using an ML-based encoder to produce, from the first face, a faceprint vector having a reduced dimension in relation to the first face; obtaining, from at least one ML-based perturbation module, a difference vector, corresponding to the dimension of the faceprint vector; modifying one or more elements of the faceprint vector according to the difference vector; and using an ML-based decoder to generate the second face from the modified faceprint vector.

Embodiments of the invention may include training the at least one ML-based perturbation module by: receiving at least one data element pertaining to an anonymization requirement; receiving a training set of faceprint vectors; and training the at least one perturbation module on the training set to produce a difference vector, such that the generated second face corresponds to the anonymization requirement, according to feedback from at least one viewing entity and from at least one attribute classifier.

Embodiments of the invention may include an inference stage, in which the at least one ML-based perturbation model may be configured to: receive at least one first data element pertaining to an anonymization requirement; receive at least one second data element pertaining to a faceprint vector; and produce at least one difference vector based on the training as a function of the anonymization requirement and faceprint vector.

According to some embodiments of the invention, training the at least one ML-based perturbation model may include: (a) providing a first face of a training set as a first input to at least one of the viewing entity and attribute classifier, to obtain a first classification; (b) producing, by the ML-based encoder, from the first face of the training set a respective faceprint vector; (c) producing, by the ML-based decoder, from the faceprint vector a respective second face; (d) providing the second face as a second input to at least one of the viewing entity and attribute classifier to obtain a second classification; (e) analyzing the first classification and second classification in view of the anonymization requirement; (f) modifying the difference vector according to the analysis to obtain a second, perturbated face; (g) repeating steps (b) through (f) until the anonymization requirement is met; and (h) repeating steps (a) through (g) with another first face of the training set.

According to some embodiments of the invention, wherein producing a second face may include: using an ML-based encoder, to produce, from the first face, a faceprint vector having a reduced dimension in relation to the first face; and using a generative neural network (GNN) module to generate the second face from the faceprint vector. The GNN module may be, or may include, for example a generative adversarial network (GAN) module, adapted to generate the second face from the modified faceprint vector.

Additionally, or alternatively, producing a second face may include: using an ML-based encoder to produce, from the first face, a separated faceprint vector, such that a first group of elements of the separated faceprint vector pertains to a first attribute, and a second group of elements of the separated faceprint vector pertains to a second attribute; changing at least one value of an element of separated faceprint vector, according to at least one anonymization requirement; and using an ML-based decoder to generate a second, perturbated face from the modified, separated faceprint vector.

According to some embodiments of the invention, the first set of attributes may be, or may include, for example positioning attributes of a face in an image. In such embodiments, producing a second face may include: producing one or more first landmark data elements pertaining to specific points of interest of the first face; producing one or more second landmark data elements pertaining to specific points of interest of a face received from an image repository; and warping the face received from an image repository, so that the position of the one or more first landmarks match the position of the one or more second landmarks, so as to obtaining anonymization of the first face while maintaining at least one positioning attribute of the first face.

Embodiments of the invention may be configured perturbating the first face via a plurality of routes, as elaborated herein (e.g., in relation to FIG. 4), so as to obtain a plurality of perturbated faces. Embodiments of the invention may receive at least one anonymization requirement, defining one or more attributes to be preserved or maintained and/or one or more attributes to be modified during an anonymization process. Embodiments of the invention may select a perturbated face from the plurality of perturbated faces, which best satisfies the at least one anonymization requirement.

Embodiments of the invention may include a system for anonymizing a face in an image. Embodiments of the system may include a non-transitory memory device, wherein modules of instruction code may be stored, and a processor associated with the memory device, and configured to execute the modules of instruction code. Upon execution of the modules of instruction code, the processor may be configured to: extract, from a first set of images a first face, depicting a person and having a first set of attributes; and perturbate the first face to produce a second face having a second set of attributes. The second set of attributes may be adapted to be perceived, by an attribute classifier, as substantially equivalent to the first set of attributes, and the second face may be adapted to be visually perceived by a viewing entity as not pertaining to the depicted person.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 7 is a flow diagram depicting a method of anonymization of an image, according to some embodiments of the invention.

Figure 1:
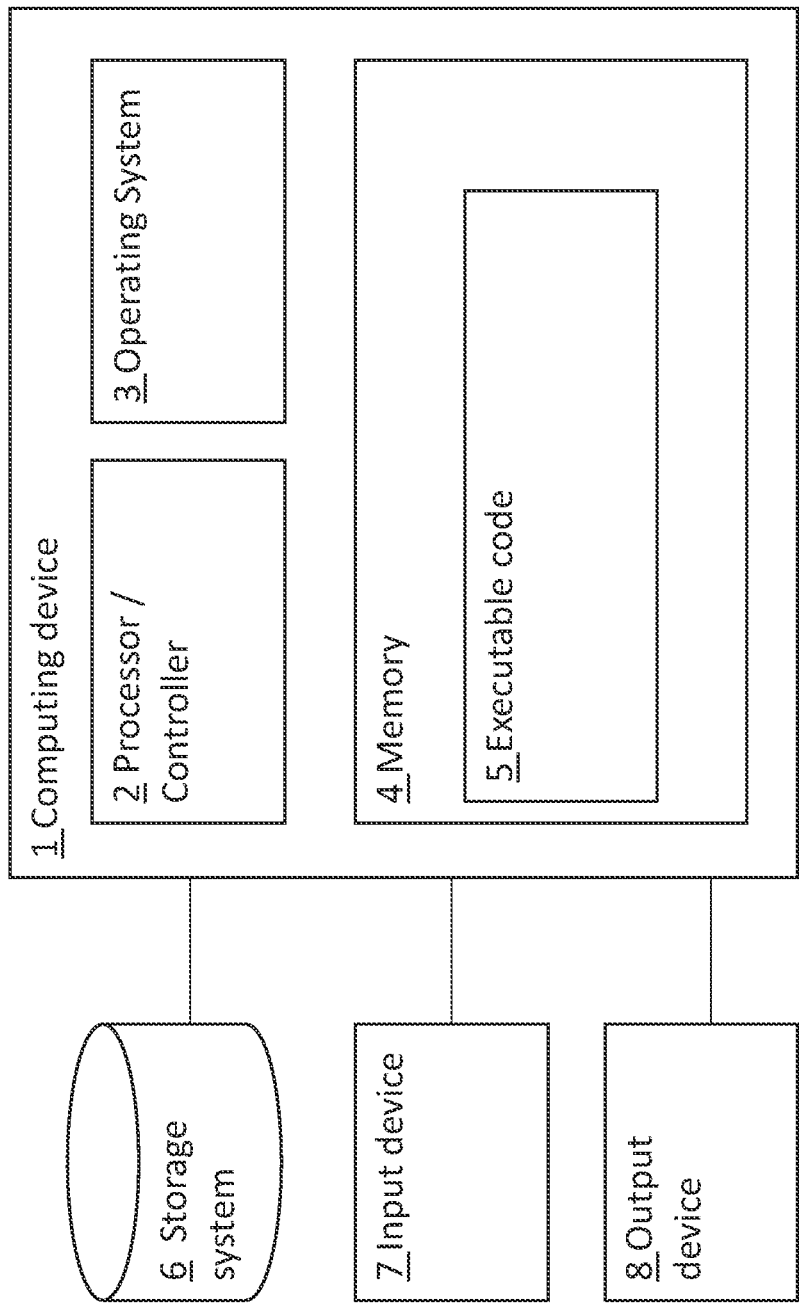
FIG. 1 is a block diagram, depicting a computing device which may be included in a system for anonymization of a face in an image according to some embodiments.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

One skilled in the art will realize that the invention may be embodied in other specific forms without departing from the spirit or essential characteristics thereof. The foregoing embodiments are, therefore, to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing." "computing." "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

Some embodiments of the present invention disclose a method and a system for anonymization of a face in an image.

Reference is now made to FIG. 1, which is a block diagram depicting a computing device, which may be included within an embodiment of a system for anonymization of a face in an image, according to some embodiments.

Computing device 1 may include a controller 2 that may be, for example, a central processing unit (CPU) processor, a chip or any suitable computing or computational device, an operating system 3, a memory 4, executable code 5, a storage system 6, input devices 7 and output devices 8. Controller 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to some embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of Computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be, or may include a plurality of, possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc. may store instructions or code which when executed by a processor may cause the processor to carry out methods as described herein.

Executable code 5 may be any executable code, e.g., an application, a program, a process, task or script. Executable code 5 may be executed by controller 2 possibly under control of operating system 3. For example, executable code 5 may be an application that may anonymize a face in an image as further described herein. Although, for the sake of clarity, a single item of executable code 5 is shown in FIG. 1, a system according to some embodiments of the invention may include a plurality of executable code segments similar to executable code 5 that may be loaded into memory 4 and cause controller 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit.

For example, some embodiments of the invention may include one or more data elements or structures that may be or may include one or more machine learning (ML) models, such as one or more neural networks (NNs), as elaborated herein. The one or more ML models may be stored in storage system 6 and may be loaded from storage system 6 into memory 4 where it may be processed by controller 2.

The term neural network (NN), e.g., a neural network implementing machine learning, may be used herein to refer to an information processing paradigm that may include nodes, referred to as neurons, organized into layers, with links between the neurons. The links may transfer signals between neurons and may be associated with weights. A NN may be configured or trained for a specific task, e.g., pattern recognition or classification. Training a NN for the specific task may involve adjusting these weights based on examples. Each neuron of an intermediate or last layer may receive an input signal, e.g., a weighted sum of output signals from other neurons, and may process the input signal using a linear or nonlinear function (e.g., an activation function). The results of the input and intermediate layers may be transferred to other neurons and the results of the output layer may be provided as the output of the NN. Typically, the neurons and links within a NN are represented by mathematical constructs, such as activation functions and matrices of data elements and weights. A processor, e.g., CPUs or graphics processing units (GPUs), or a dedicated hardware device, may perform the relevant calculations.

In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., controllers similar to controller 2), a plurality of input units, a plurality of output units, a plurality of memory units, and a plurality of storage units.

Figure 2:
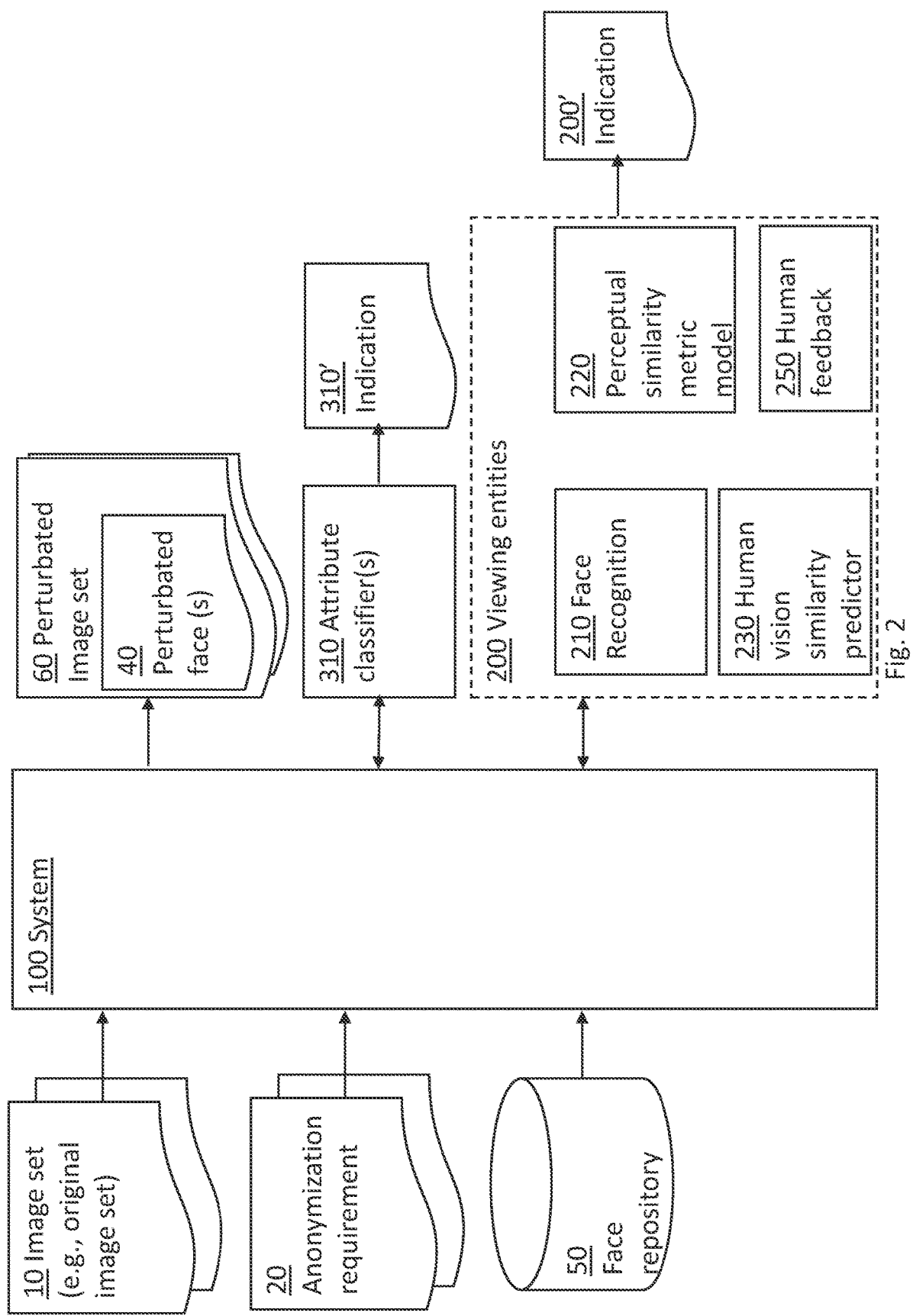
FIG. 2 is a block diagram, depicting a system for anonymization of a face in an image, according to some embodiments of the invention.

Reference is now made to FIG. 2, which is a block diagram depicting an overview of a system 100 for anonymizing a face in an image, according to some embodiments of the invention. System 100 may be or may include one or more computing devices such as element 1 of FIG. 1, including at least one processor or controller (e.g., element 2 of FIG. 1) adapted to perform methods for anonymizing at least one face in at least one image, as elaborated herein.

As shown in FIG. 2, system 100 may receive a set of original images 10 that may include a face. For example, in some embodiments, the set of original images 10 may include a single, still image, depicting at least one person's face. Additionally, or alternatively, original image set 10 may be, or may include a video stream or video file, that may include a plurality of images, depicting movement of at least one person's face. The terms original image 10 and original image set 10 may be used herein interchangeably, to refer to one or more original images, according to context.

Figure 3:
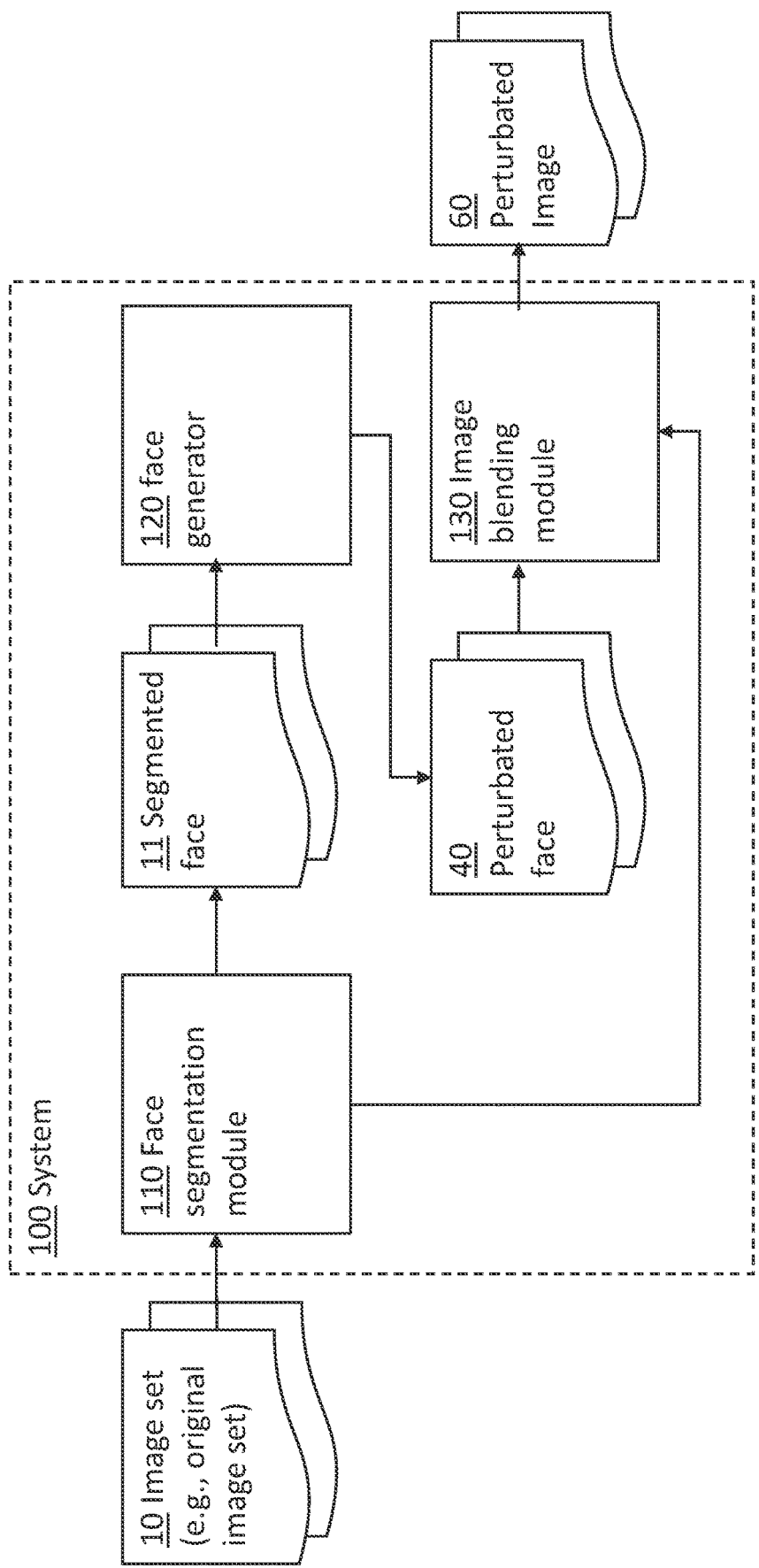
FIG. 3, which is a block diagram depicting a schematic overview modules of system 100, according to some embodiments of the invention.

System 100 may be adapted to produce, from original images set 10, a set (e.g., at last one) of perturbated image 60 that may include a perturbated, generated or changed face (e.g., element 40 of FIG. 3). The terms perturbated face 40 and perturbated face set 40 may be used herein interchangeably, to refer to one or more perturbated faces, according to context. Similarly, the terms perturbated image 60 and perturbated image set 60 may be used herein interchangeably, to refer to one or more perturbated images, according to context.

For example, the set of original images 10 may include an image file (e.g., a Joint Photographic Experts Group (JPEG) format file, a bitmap (BMP) format file and the like) including exactly one image that includes a face, such as a face of a human person. System 100 may produce therefrom a set of at least one perturbated image 60. Perturbated image 60 may be or may include an image file (e.g., a JPEG file, a BMP file, etc.) that may include a perturbated face, based on the face in original image set 10, as elaborated herein.

Additionally. or alternatively, the set of original images 10 may be or may include a video file such as a Moving Pictures Experts Group (MPEG) format file that may include a set of moving images of a face, such as a face of a human person. System 100 may produce therefrom at least one perturbated image set 60. Perturbated image set 60 may be or may include a set of moving images such as an MPEG video file that may include a perturbated face, based on the face in original image set 10, as elaborated herein.

The term 'face' may be used herein to refer to a data structure such as a table of data elements that may represent or describe a face, such as a face of a human person.

The term 'perturbated' may be used herein in the context of a perturbated face to refer to a data structure of a face that may be generated, perturbated or changed in relation to an original face (e.g., a face included in original image set 10). For example, as elaborated herein, some embodiments of the invention may receive a first, original image 10 that may include a face pertaining to a person and may produce a second, perturbated image 40, including or depicting a perturbated face, that may include facial attributes that may be similar or identical to facial attributes of the originally depicted person, but may also be unrecognizable by a viewing entity 200 (e.g., according to feedback from a human viewer 250) as pertaining to the depicted person in the first image set 10.

According to some embodiments, as shown in FIG. 2, system 100 may include, or may collaborate with, one or more viewing entities 200, which may be adapted to produce an identity indication 200', pertaining to an identity of a face. The one or more viewing entities 200 may include, for example, feedback (e.g., via input device 7 of FIG. 1) from a human viewer 250. Additionally, or alternatively, the one or more viewing entities 200 may include a face-recognition (FR) classifier 210 as known in the art, a perceptual similarity metric model 220 as known in the art, a human vision similarity predictor 230, as known in the art, and the like. The term "perceptual similarity metric model" may be used herein to refer to a deep neural network (DNN) that may be trained according to a perceived human similarity prediction and may be trained in a supervised manner by a human viewer, as known in the art.

For example, FR 210 may be adapted to produce a first indication of identity 200' pertaining to a first face, and a second indication of identity 200' pertaining to a second face. A small difference (e.g., below a predefined threshold) between the first indication of identity 200' and second indication of identity 200' may indicate that the first face and second face pertain to the same person. In a complementary manner, a large difference (e.g., beyond a predefined threshold) between the first indication of identity 200' and second indication of identity 200' may indicate that the first face and second face do not pertain to the same person.

It may be appreciated that many specific implementations of viewing entities 200 (e.g., 210, 220, 230, 250) may be possible, resulting in many possible configurations of identity indication 200'. Embodiments of the invention may be adapted to collaborate with any specific implementation of said viewing entities 200, so as to anonymizing a face in a set of images 10, as elaborated herein.

According to some embodiments, system 100 may include, or may collaborate with an attribute classification model or attribute classifier 310, as known in the art. For example, system 100 may utilize attribute classifier 310 to obtain at least one attribute indication 310', that may indicate an existence or a value of at least one attribute of a face depicted in an image.

For example, attribute classifier 310 may receive an image, or a segment or portion of an image that may include or depict a face, and may produce at least one attribute indication 310'. Attribute indication 310' may be, or may include an indication of existence, or a value of one or more (e.g., a set of) attributes of the depicted face.

According to some embodiments, the set of attributes may include, for example, facial attributes of the depicted face, such as an age, a gender, an ethnicity, an emotion, an expression, a complexion, eye color, and the like. In another example, the set of attributes may include positioning attributes of the depicted face, such as a face elevation angle, a face orientation angle, a position of the face in an image, and the like. In yet another example, the set of attributes may include accessory attributes, indicating an existence of elements or accessories, included in the depicted face. Such accessory attributes may include for example, existence of spectacles on the face, existence of jewelry on the face, existence of hair dressing accessories, and the like.

According to some embodiments of the invention, system 100 may extract or segment from the first set of images 10 a segment of a first face (e.g., segmented face element 11 of FIG. 3), depicting a face of a person, and having a first set of attributes. System 100 may receive (e.g., from input device 7 of FIG. 1) one or more anonymization requirements 20 pertaining to one or more attribute indications 310', and may produce a perturbated image set 60 according to the one or more anonymization requirements 20.

Anonymization requirement 20 may be or may include a definition, or a combination of one or more definitions of one or more attributes to be preserved and/or one or more attributes to be changed during an anonymization process.

For example, anonymization requirement 20 may include a requirement to produce a perturbated image set 60 that may include a perturbated face, in which the perturbated face may preserve or include one or more facial attributes (e.g., ethnicity and expression) that are the same (e.g., same ethnicity, same expression) as those of a face in the original received image set 10, but also be unrecognizable by one or more viewing entities 200 (e.g., feedback from a human viewer 250 and/or by an FR classifier 210) as pertaining to the same person.

The Term

In other words, system 100 may perform a perturbation of the first face (e.g., of original image set 10, or of segmented face 11), to produce a second, perturbated face 40 in a perturbated image or image set 60. The second, perturbated face 40 may have a second set of attributes (e.g., ethnicity and expression) that may be visually perceived by attribute classifier 310 as being substantially equivalent (e.g., having similar or equal values) to the first set of attributes. The second, perturbated face 40 may be adapted to be visually perceived by the viewing entity 200 (e.g., the human viewer feedback 250, the FR classifier 210, the human vision similarity predictor 230, perceptual similarity metric model 220 and the like) as not pertaining to the same person depicted in the original, received first image set 10.

The second, perturbated face 40 may thus be referred to as "anonymized" (e.g., according to anonymization requirement 20), in a sense that a viewing entity 200 (e.g., an FR classifier 210) may not identify perturbated face 40 (e.g., outcome of system 100) as pertaining to the same person as depicted in original face 10 and/or segmented face 11.

It may be appreciated that anonymization requirement 20 may include many combinations of requirements for maintaining and/or changing of attributes between an original face, depicted in original image set 10 and perturbated face 40. For example, an implementation of embodiments of the invention may be adapted to anonymize a face while maintaining or preserving a person's age and/or gender attribute. Such an implementation may, for example, enable embodiments of the invention to analyze these attributes in a specific group of people, such as clientele in a shop. Embodiments of the invention may be adapted to, or trained to accommodate any specific anonymization requirement 20 or combination thereof, as elaborated herein.

Reference is now made to FIG. 3, which is a block diagram depicting a schematic overview of system 100, according to some embodiments of the invention. System 100 of FIG. 3 may be substantially identical to system 100 of FIG. 2, and elements depicted in FIG. 2 may have been omitted in FIG. 3 for the purpose of clarity.

As shown in FIG. 3, system 100 may include a face segmentation module 110, adapted to segment or extract a face, included in an image of the original, received image set 10 to produce a set (e.g., at least one) respective segmented face 11 data elements. The terms segmented face 11 and segmented face set 11 may be used herein interchangeably, to refer to one or more segmented faces, according to context.

According to some embodiments, segmented face data element 11 may be, or may include a data structure, that includes a plurality of pixels depicting a face, separated from a background of an image of image set 10. Additionally, or alternatively, segmented face data element 11 may be, or may include a data structure, that includes a plurality of pixels depicting an interior part of a face (e.g., a face, excluding the hair portion), separated from the rest of a respective image of image set 10.

According to some embodiments, segmented face set 11 may be used as input to a face generator module 120, which may, in turn, produce therefrom a set of respective perturbated face 40 data elements (e.g., one or more face data elements 40), as elaborated herein.

According to some embodiments, system 100 may include an image blending module 130, adapted to receive the perturbated face set 40 from face generator module 120 and a complementary portion (e.g., an inverse portion) of the segmented face 11 from face segmentation module 110. For example, the complementary portion may include a background of segmented face 11 in the respective original face set 10. Image blending module 130 may be adapted to blend the background of the first set of images 10 with the perturbated face 40 set, so as to produce or generate one or more perturbated images 60, or a perturbated image set 60, depicting perturbated face 40 with the background of the received image set 10.

Additionally, or alternatively, segmented face 11 may include an internal section of a face in image 10 (e.g., excluding hair, clothing, etc.). Thus the term segmentation may refer, in this context, to separation between this internal section and the rest of image 10 (e.g., rather than between the face including the hair and a background). In such embodiments, image blending module 130 may be adapted to receive a perturbated face 40 from face generator module 120 and one or more portions of a respective image of original image set 10, that were not included in segmented face 11. Image blending module 130 subsequently may blend perturbated face 40 with said portions of a respective image of original image set 10, so as to produce or generate one or more perturbated images 60 that depicting the perturbates face 40 with said portions of an original image of image set 10, that were not included in segmented face 11.

Figure 4:
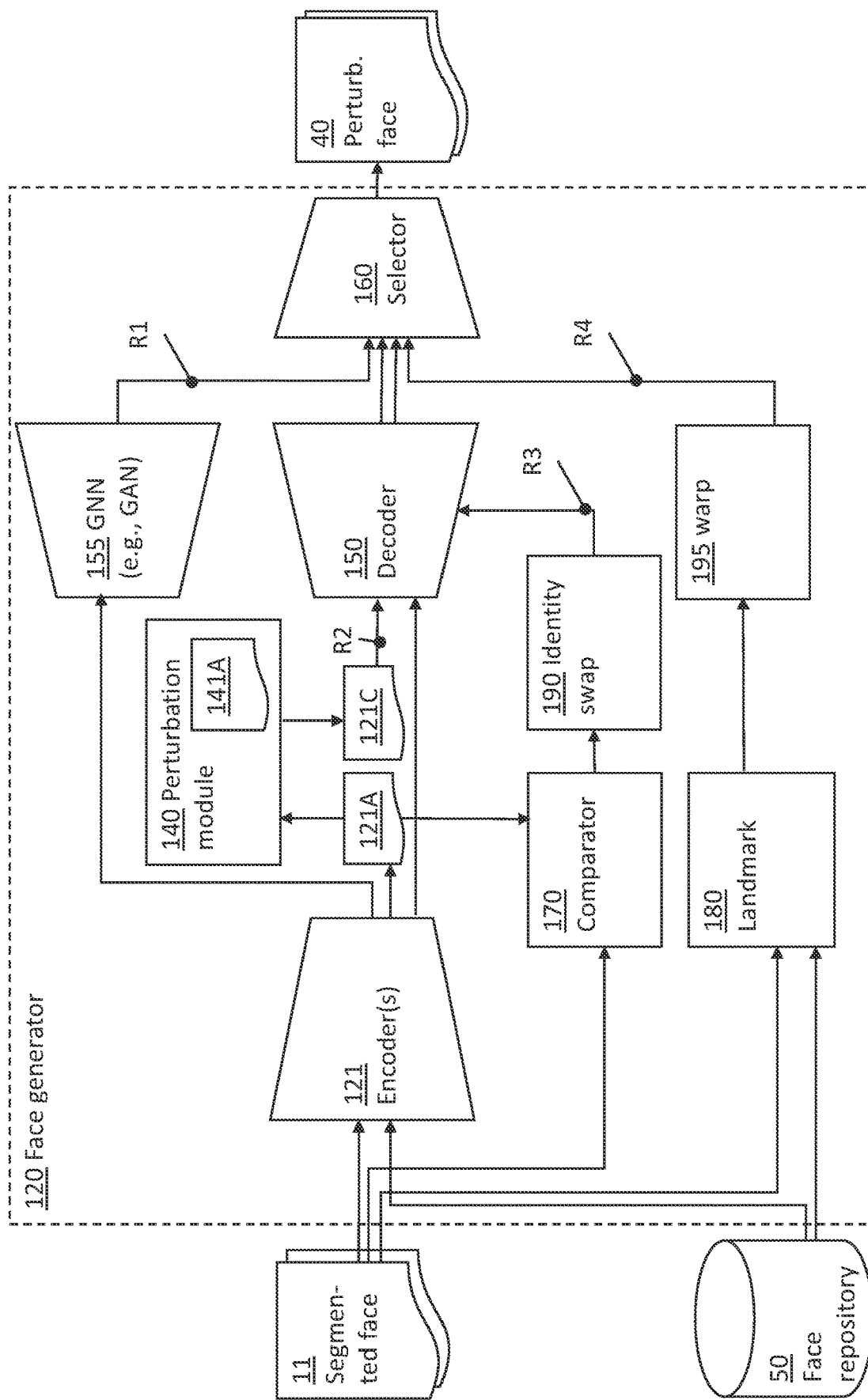
FIG. 4, is a block diagram depicting an overview of a face generator module, which may be included in a system for anonymizing a face in an image, according to some embodiments of the invention.

Reference is now made to FIG. 4, which is a block diagram depicting an overview of face generator module 120, which may be included in a system 100 for anonymizing a face in an image, according to some embodiments of the invention. According to some embodiments, face generator module 120 may be or may include one or more computing devices such as element 1 of FIG. 1, including at least one processor or controller (e.g., element 2 of FIG. 1). Additionally, or alternatively, face generator module 120 may be or may include one or more software modules and may be adapted to be executed by a processor (e.g., element 2 of FIG. 1) of a computing device (e.g., element 1 of FIG. 1) as software applications, processes or tasks.

As shown in FIG. 4, face generator module 120 may employ one or more routes (depicted as R1, R2, R3 and R4) for producing a perturbated face 40. Each such route may employ a different combination of modules or components of face generator module 120, as elaborated herein. Face generator module 120 may include a selector module 160, adapted to select at least one perturbated face 40, originating from the one or more routes R1 through R4, as elaborated herein.

According to some embodiments, face generator model 120 may include one or more machine-learning (ML) based models, adapted to produce or generate a perturbated face 40 from segmented face 11. As shown in FIG. 4, the one or more ML-based models may include, for example, an encoder 121, a decoder 150, a perturbation model 140, a generative neural network (GNN) module 155, and a comparator 170 module. Said one or more ML based models may, for example, be implemented by a neural network (NN) architecture, as known in the art.

A neural network (e.g. a neural network implementing ML), may refer to an information processing paradigm that may include nodes, referred to as neurons, organized into layers, with links between the neurons. The links may transfer signals between neurons and may be associated with weights. A NN may be configured or trained for a specific task, e.g., pattern recognition or classification. Training a NN for the specific task may involve adjusting these weights based on examples. Each neuron of an intermediate or last layer may receive an input signal, e.g., a weighted sum of output signals from other neurons, and may process the input signal using a linear or nonlinear function (e.g., an activation function). The results of the input and intermediate layers may be transferred to other neurons and the results of the output layer may be provided as the output of the NN. Typically, the neurons and links within a NN are represented by mathematical constructs, such as activation functions and matrices of data elements and weights. A processor, e.g. CPUs or graphics processing units (GPUs), or a dedicated hardware device may perform the relevant calculations.

Embodiments of the present invention may be employed in one or more stages, including a training stage, a verification stage and an inference stage. As known in the art, during the training stage, one or more of said ML-based models may be trained on a training dataset of segmented images 11; during the verification stage, one or more of said ML-based models may be verified, so as to "fine tune" the training of the one or more ML-based models; and during the inference stage the one or more ML-based models may be inferred of executed on a runtime set of segmented images 11. An overall explanation of these training stage, verification stage and inference stage will be followed by further, more elaborate explanation of each ML-based model.

In the training stage, the one or more ML-based models (e.g., elements 121, 140, 150, 155, 170) may be trained on a labeled image training set (e.g., original images 10) depicting faces of people, and/or on segmented images (e.g., segmented faces 11) to produce a respective set of perturbated faces, as elaborated herein.

According to some embodiments, training the one or more ML-based models (e.g., elements 121, 140, 150, 155, 170) of face generator module 120 may include: receiving at least one labeled image of a face, pertaining to the labeled training set of segmented faces 11 as a first input; receiving at least one output indication 200' of a viewing entity 200 (e.g., elements 210, 220, 230 and/or 250 of FIG. 2) as a second input; receiving at least one indication 310' of an attribute classifier 310 as a third input; and iteratively training one or more ML-based models (e.g., elements 121, 140, 150, 155, 170) of face generator module 120 on said inputs to produce a perturbated face 40 or perturbated face set 40.

For example, during the training stage, the one or more ML-based models of face generator 120 may be trained such that:

(a) The one or more perturbated faces of perturbated face set 40 may correspond to, or include attributes that may be perceived by an attribute classifier 310 as substantially equivalent to respective attributes that may be included in a training set of original, segmented faces 11; and (b) The perturbated face set 40 may be visually perceived by a viewing entity 200 (e.g., feedback from a human viewer 250, an FR classifier 210, a perceptual similarity metric model 220 and/or a human vision similarity predictor 230) as not pertaining to respective people depicted in original image training set 10 or the subsequent of extracted or segmented faces 11.

For example, an attribute classifier 310 may be adapted to detect or indicate 310' that a facial attribute (e.g., an emotion such as happiness) is depicted in, or included in an image of a segmented face 11. During the training stage, the one or more ML-based models of face generator module 120 may be trained such that attribute classifier 310 may identify the same attribute (e.g., the happiness emotion) in both an input segmented face 11 and a respective perturbated face 40, while a viewing entity, such as a human vision similarity predictor 230 may indicate 200' or identify that the faces depicted in segmented face 11 and perturbated face 40 do not pertain to the same person.

According to some embodiments, in the verification stage, one or more ML-based models (e.g., NN nodes included in said models) may be adjusted to improve a performance or outcome of face generator module 120, as elaborated herein.

In the inference stage, face generator module 120 may receive one or more first, extracted or segmented face data elements 11, and may produce respective, one or more perturbated face 40 data elements from the one or more first, extracted or segmented face 11, based on the training of the one or more ML-based models of face generator module 120.

Pertaining to the same example, face generator module 120 may produce a perturbated face 40 having one or more facial attributes (e.g., the expression, ethnicity and/or age), that are the same (e.g., as indicated 310' by an attribute classifier 310) as a respective, input segmented face data element 11, while viewing entity 200 (e.g., human vision similarity predictor 230) may indicate 200' or identify that the faces depicted in segmented face 11 and perturbated face 40 do not pertaining to the same person.

As shown in FIG. 4, perturbated face set 40 may be produced in one of a plurality of methods or routes (enumerated in FIG. 4 as R1, R2, R3 and R4). Each of the one or more routes R1-R4 may produce a perturbated face 40 or perturbated face set 40, thus resulting in a plurality of a perturbated faces 40 or perturbated face sets 40.

Face generator module 120 may include a selector module 160 that may be adapted to, during the inference stage, select an optimal perturbated face 40 or perturbated face set 40 from the plurality of perturbated face sets 40 (e.g., corresponding to the plurality of routes R1 through R4) according to one or more output indication of a viewing entity 200 and/or anonymization requirement 20.

For example, anonymization requirement 20 may determine that the perturbated face should be anonymized, while maintaining or preserving a facial feature or attribute (e.g., age). According to some embodiments, FR classifier 210 and an attribute classifier 310 (e.g., an age attribute classifier 310) may receive a segmented face 11 and a first perturbated face 40, produced by a first route (e.g., R1), as elaborated herein. FR classifier 210 may be adapted to produce a first identity indication or score 200', indicating a first level of resemblance of the first perturbated face 40 to the segmented face 11. Attribute classifier 310 (e.g., an age classifier 310) may produce a first attribute indication or score 310', indicating a level of resemblance of an attribute (e.g., the age) of the first perturbated face 40 to the attribute (e.g., the age) in segmented face 11. In a similar manner, FR classifier 210 and attribute classifier 240 (e.g., an age classifier 240) may receive a second perturbated face 40, produced by a second route (e.g., R2), as elaborated herein. FR classifier 210 may produce a second identity indication or score 200', indicating a second level of resemblance of the second perturbated face 40 to the segmented face 11, and attribute classifier 310 (e.g., age attribute classifier 310) may produce a second attribute score or indication 310', indicating a level of resemblance of the attribute (e.g., age) of the second perturbated face 40 to the attribute (e.g., age) in segmented face 11. In this example, if the first identity indication or score 200' of the first perturbated face 40 (e.g., obtained via the first route R1) is higher than the second identity indication or score 200' of the second perturbated face 40 (e.g., obtained via the second route R2) and the first attribute indication or score 310' is equal to the second attribute indication or score 310', then selector module 160 may be configured to select the second perturbated face 40 (e.g., obtained via the second route R2), as it may include or describe a face that may less resemble the original segmented face 11, whereas the age facial attribute may be similarly preserved in both routes (e.g., R1 and R2). In this context, the selected (e.g., the second) perturbated face 40 may be referred to as optimal, in a sense that it may be the perturbated face 40 that best accommodates the constraints or requirements as presented by anonymization requirement 20, from the plurality of perturbated faces 40 or perturbated face sets 40 (e.g., obtained via routes R1-R4).

According to some embodiments, face generator module 120 may include an encoder module 121, adapted to receive as input a segmented face 11 data element and to produce therefrom a faceprint vector 121A (or "code" as commonly referred to in the art), having a reduced dimension in relation to the dimension of the input segmented face 11, as known in the art. For example, a dimension of the input segmented face 11 may be in an order of the number of pixels in input segmented face 11 (e.g., in a 256×256 image the dimension of the input segmented may be in the order of 65536 elements). A corresponding faceprint vector 121A (or "code") may be, for example in the order of a few tens or hundreds of elements.

According to embodiments of the invention, encoder module 121 may include an ML model such as NN, a linear model, a linear regression model and the like.

According to some embodiments, face generator module may further include an ML-based, GNN module 155, adapted to generate an image from a low dimension vector (or "code"), such as faceprint vector 121A. This embodiment is marked in FIG. 4 route R1.

In other words, GNN module 155 may be trained on segmented photographs of faces (e.g., segmented faces 11) to generate new photographs of faces (e.g., perturbated faces 40) that may appear authentic to human observers. According to some embodiments, GNN 155 may receive faceprint vector 121A from encoder 121 and may produce a corresponding perturbated face 40 from the received faceprint vector 121A.

According to some embodiments, GNN module 155 may be, or may include a generative adversarial network (GAN) module. As known in the art, given a training set, GAN module 155 may be trained to generate new data (e.g., an image) with the same statistics as the training set. For example, GAN module 155 may be trained to receive faceprint vector 121A, corresponding to input segmented face 11 from encoder 121, and may produce therefrom a perturbated face 40, having at least one facial attribute that is substantially equal (e.g., according to attribute indication 310') to a facial attribute of segmented face 11.

In this context, a facial attribute (e.g., age, ethnicity, emotion, etc.) of perturbated face 40 may be referred to as substantially equal to a corresponding facial attribute (e.g., age, ethnicity, emotion, etc.) of segmented face 11 in a sense that an attribute classifier 310 may classify segmented face 11 and perturbated face 40 as having the same value (e.g., depicting a person of a similar age, a similar ethnicity and/or presenting a similar emotion, respectively).

Figure 5:
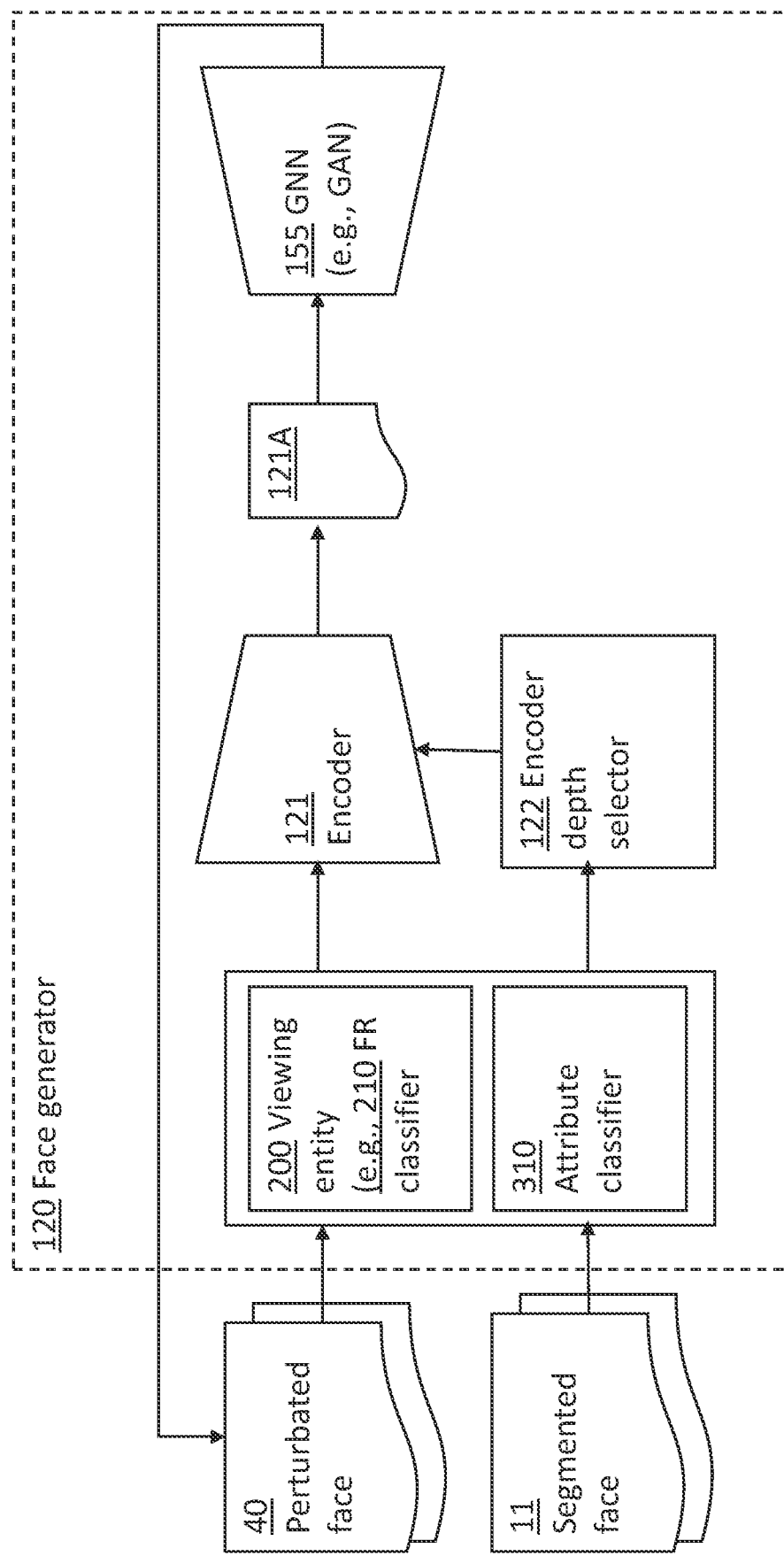
FIG. 5, which is a block diagram depicting training of an encoder during a training stage of a system for anonymization of an image, according to some embodiments of the invention.

Reference is now made to FIG. 5, which is a block diagram depicting a process of training encoder 121 and/or GNN module 155 during a training stage of system 100 for anonymization of an image, according to some embodiments.

According to some embodiments of the invention, during the training stage, encoder 121 and/or GNN module 155 may be trained on a training set of segmented faces 11, using supervisory feedback from one or more viewing entities 200 (e.g., indication 200') and/or from one or more as attribute classifiers 310 (e.g., indication 310').

According to some embodiments, encoder 121 and GNN module 155 may be trained together (e.g., simultaneously), using the same training data set of segmented face data elements 11.

Additionally, or alternatively, encoder 121 and GNN module 155 may be trained separately, or iteratively. In such embodiments, in a first iteration, a first module (e.g., encoder 121) may be trained by changing one or more weights or values of nodes included in that module (e.g., encoder 121), as known in the art, and the second module (e.g., GNN module 155) may be kept unchanged (e.g., "frozen", as commonly referred to in the art). In a subsequent iteration, the second module (e.g., GNN module 155) may be trained, and the first module (e.g., encoder 121) may be kept unchanged. This iterative process may proceed continuously, or repetitively, so as to train elements of route R1 (e.g., encoder 121 and GNN module 155). Subsequent to said training, encoder 121 may be adapted to receive a segmented face 11 data element, and produce therefrom a faceprint vector 121A and GNN module 155 may be adapted to receive faceprint vector 121A and produce therefrom a perturbated face 40B, according to anonymization requirement 20. For example, GNN module 155 may be adapted to receive faceprint vector 121A and produce therefrom a perturbated face 40B that best resembles segmented face 11 according to an indication 310' of one or more attribute classifiers 310.

According to some embodiments of the invention, encoder 121 may be trained on a training set of segmented faces 11 to minimize a cost function element, according to the following equation, Eq. 1:

$$\text{Cost} = \|A(I) - A(G(E(I)))\| \qquad \text{Eq. 1}$$

where:
"Cost" is the cost function element;
$\|\cdot\|$ represents a norm operator (e.g., an absolute value operator, a mean square error operator, etc.);
"I" represents a segmented face 11 data element;
"A(·)" represents a numerical indication of one or more attributes of an attribute classifier 240 (e.g., an expression classifier 240, a gender classifier 240 and the like);
"E(·)" represents an output from encoder 121 that may be a faceprint vector; and
"G(·)" represents a perturbated face 40 that may be output from GNN 155.

It may be appreciated by a person skilled in the art that a perturbated face 40 that may be output from GNN 155 in response to an input of a reduced-dimension faceprint vector 121A may undergo changes in relation to an originally received (and segmented) face 11, and may thus become unrecognizable by a viewing entity (e.g., according to feedback from a human viewer 250, by an FR classifier 210, by a perceptual similarity metric module 220, by a human vision similarity predictor 230, etc.) as pertaining to the segmented face 11. Such changes may be referred to in the art as "reconstruction loss". Embodiments of the invention may exploit or utilize this feature of reconstruction loss to enhance anonymization of the produced perturbated face 40.

According to some embodiments of the invention, during one of the training stage and the verification stage, a change may be applied to at least one dimension associated with encoder 121, so as to change (e.g., increase) the reconstruction loss. For example, embodiments of the invention may limit a dimension of faceprint vector 121A, so as to decrease a representation space that may be associated with the dimension of faceprint vector 121A. and thus increase the reconstruction loss and enhance anonymization of the produced, perturbated face 40. Additionally, or alternatively, embodiments of the invention may modify a dimension of encoder 121, based on at least one indication 200' of a viewing entity 200. According to embodiments of the invention, a dimension or complexity of encoder 121 may include the number of nodes, connections between nodes and other elements of encoder 121. Thus, reducing the dimension or complexity of encoder 121 may include reducing the number of nodes in encoder 121, reducing the number of layers in encoder 121, eliminating or removing connections or links between nodes or layers in encoder 121, or performing any other action that would reduce the complexity of encoder 121 and therefore degrade the performance of encoder 121, e.g., degrade the ability of encoder 121 together with decoder 150 to reconstruct face that are identical to the original or input face.

According to some embodiments of the invention, face generator module 120 may include a depth selector module 122, adapted to modify a depth (or "shallowness" as commonly referred to in the art) of encoder 121.

For example, embodiments of the invention may initially allocate a large number of neural nodes to encoder 121. During training of encoder 121, a difference in identity (e.g., a difference between an indication 200' of FR 210, pertaining to a segmented face 11 and an indication 200' of FR 210 pertaining to a respective perturbated face 40) may be below a predefined threshold (e.g., indicating that segmented face 11 and perturbated face 40 pertain to the same person). In this condition, depth selector 122 may be configured to reduce the dimension of encoder 121. Such reduction of dimension of encoder 121 may include, for example, reduction of the number of NN nodes in a layer of encoder 121, omission of one or more NN layers of encoder 121, and the like. Following such a reduction of dimension of encoder 121, embodiments of the invention may reinitialize training of encoder 121, using the reduced dimensionality. Such reduction of dimension may be repeated until a minimal encoder dimension limit is reached. For example, a minimal encoder dimension limit may be a predefined number of neural network (NN) nodes. In some implementations of embodiments of the invention, the minimal encoder dimension limit may be a product of the number of pixels in segmented face 11 and faceprint vector 121A.

According to some embodiments, anonymizing a face in a set of images may include, in a first training stage, training ML based face generator model 120, including a face encoder 121 and a face decoder 150 (or GNN module 155), to reconstruct an input image of a face. In some embodiments, the reconstructed image at this stage may be substantially similar to the input image. For example, an image of a face generated by the face generator model 120 from an input image of the face at this stage of training would be visually perceived by viewing entity 200 as pertaining to a same person as in the input image, and one or more attributes of the face in the generated image would be perceived by an attribute classifier 310 as substantially equivalent to attributes of the input image. According to some embodiment, face decoder 150 may be or may include GNN module 155.

According to some embodiments, anonymizing a face in a set of images may include, in a second training stage, reducing a dimension, or reducing the complexity, of the face encoder 121, thus providing a reduced dimension face generator 120, and retraining the reduced dimension face generator 120 so that an image of a face generated by reduced dimension face generator 120 from the input image would be visually perceived by viewing entity 200 as not pertaining to the same person as in the input image, and attributes of the face in the generated image would be perceived by attribute classifier 310 as substantially equivalent to the attributes of the input image.

According to embodiments of the invention, deliberately reducing the dimension or complexity of face encoder 121 may aid in anonymizing an image, while preserving features of the image. Reducing the dimension or complexity of face encoder 121 may degrade the quality of face encoder 121. Thus, after dimension reduction, face encoder 121 may generate faceprint vectors 121A with less information (comparing to faceprint vectors 121A generated by face encoder 121 prior to the dimension reduction), e.g., faceprint vectors 121A that don't include sufficient information to be later reconstructed by face decoder 150 to include the same identity as the input image. Thus, a benefit of reducing the quality of face encoder 121 may be generating an anonymized image from an input image, an image that would be visually perceived by viewing entity 200 as not pertaining to the same person as in the input image.

According to embodiments of the invention, reducing the dimension of the encoder may provide in some circumstances superior results over perturbating the faceprint vector 121A. Perturbating the faceprint vector 121A and using the perturbated or modified faceprint vector 121C to generate perturbated face 40 may not always give predicted or good results since the relation between the faceprint vector 121C and the perturbated face 40 in the reconstructed image are not linear. Thus, the perturbated face 40, if reconstructed from modified faceprint vector 121C may in some circumstances appear strange or not natural. In contrary, using a reduced dimension face encoder 121 that is trained to preserve facial features may provide natural results.

Furthermore, embodiment of the invention may enhance the dimension reduction process by using a cost function that would train face generator 120 to generate anonymized images that preserve attributes of the original image. For example, retraining generator model 120 after dimension or complexity reduction of face encoder 121 may include using the already trained face decoder 150, and training the reduced dimension face encoder 121 using a cost function that decreases as a level of dissimilarity (e.g., a measure that increase as the difference increase) between the attributes of the face in the generated image and the attributes of the input image decreases and increases as the level of dissimilarity in identity between the face in the generated image and the face in the input image decreases.

For example, encoder 121 may be trained on a training set of segmented faces 11 to minimize a cost function element, according to the following equation, Eq. 2:

$$\text{Cost}=\|A(I)-A(G(E(I)))\|-\|FR(I)-FR(G(E(I)))\| \qquad \text{Eq. 2}$$

where $FR(\cdot)$ is a value of a numerical indication 200' of viewing entity such as face recognition classifier 210, as known in the art. Eq. 2 is an example for a cost function that decreases as a level of dissimilarity between the attributes of the face in the generated image and the attributes of the input image decreases (e.g., a measure that increase as the difference increase, represented by positive element $\|A(I)-A(G(E(I)))\|$) and increases as the level of dissimilarity in identity between the face in the generated image and the face in the input image decreases (e.g., a measure that increase as the difference increase, represented by negative element $-\|FR(I)-FR(G(E(I)))\|$). Other cost functions may be used.

In such embodiments, encoder 121 may be trained so that GNN 155 or decoder 150 would produce a perturbated image that may be as similar as possible to the original segmented face 11 and yet not recognizable by a face recognition classifier 210. In other words, GNN module 155 may be adapted to receive faceprint vector 121A and produce therefrom a perturbated face 40B that (a) best resembles segmented face 11 according to an indication 310' of one or more attribute classifiers 310; and (b) is anonymized (e.g., does not pertain to the same person of segmented face 11), according to indication 200'.

In some embodiments, reducing the dimension or complexity, and retraining face generator model 120 may be repeated until an image of a face generated by reduced dimension face generator 120 from the input image would be visually perceived by viewing entity 200 as not pertaining to the same person as in the input image, and attributes of the face in the generated image would be perceived by attribute classifier 310 as substantially equivalent to the attributes of the input image. In some embodiments, reducing the dimension or complexity, and retraining face generator model 120 may be repeated until other or additional stopping criteria is met, for example, until a predefined encoder dimension limit is reached e.g., reducing the dimension or complexity, and retraining face generator model 120 may be repeated as long as the number of nodes, layers and/or links in the NN of encoder 121 are above a predefined threshold.

During an inference stage, face segmentation module 110 may extract anew face may from a first set of images, depicting a new person and having a first set of attributes. Reduced dimension face generator 120 may produce an anonymized face from the new face, the anonymized face having a second set of attributes, where the second set of attributes may be perceived, by attribute classifier 310 as substantially equivalent to the first set of attributes, and the anonymized face may be visually perceived by viewing entity 200 as not pertaining to the new person.

Additionally, or alternatively, encoder 121 may be trained on a training set of segmented faces 11 to minimize a weighted cost function element, according to the following equation, Eq. 3:

$$\text{Cost}=\alpha\|A_1(I)-A_1(G(E(I)))\|+\beta\|A_2(I)-A_2(G(E(I)))\|-\gamma\|FR(I)-FR(G(E(I)))\| \qquad \text{Eq. 3}$$

where:
$A_1$ and $A_2$ respectively represent numerical indications 310' of a first attribute classifier 310 (e.g., an expression classifier 310) and a second attribute classifier 310 (e.g., an ethnicity classifier 310); and
$\alpha$, $\beta$ and $\gamma$ respectively represent numerical values of weights (e.g., predefined weight values) for each of the attribute classifier 310 indications 310' and viewing entity 200 (e.g., FR classifier 210) indication 200'.

According to some embodiments, said weights (e.g., $\alpha$, $\beta$ and $\gamma$) may be included in one or more anonymization requirements 20. It may be appreciated that in such embodiments, the minimization of the weighted cost function element, as elaborated in equation Eq. 3 may satisfy the one or more anonymization requirements 20.

Reference is made back to FIG. 4, where encoder 121 and GNN 155 may produce a perturbated face in a first route or method, as marked by R1 in FIG. 4. In an inference stage (e.g., after training of encoder 121), encoder 121 may receive a new segmented face 11 (e.g., segmented form a newly received image set 10, as elaborated herein in relation to FIG. 3). Encoder 121 may produce a faceprint vector 121 and GNN 155 may generate therefrom an anonymized perturbated face according to one or more anonymization requirements 20.

As known in the art, encoder 121 may be trained to produce a faceprint vector 121A that may include separate faceprint vector elements (e.g., separate neural network node elements) for different attributes of segmented face 11. Such faceprint vectors may herein be referred to as "separated faceprint vectors".

For example, a training set of segmented faces 11 may be segmented from a respective training set of original image sets 10 that may be video files. In this configuration, a first set of attributes (e.g., age, ethnicity, gender) may remain constant throughout the training set (e.g., the video) and a second set of attributes (e.g., positioning attributes, expression attributes, etc.) may change throughout the training set (e.g., throughout the video). Hence, embodiments of the invention may separate a representation of the first set of attributes (e.g., ethnicity) from the representation of the second set of attributes (e.g., emotions).

For example, embodiments of the invention may constrain encoder 121 to produce a faceprint vector 121A such that a first group of elements of faceprint vector 121A may pertain to a first attribute (e.g., ethnicity), and a second group of elements of faceprint vector 121A may pertain to a second attribute (e.g., emotion). It may be appreciated that some elements of faceprint vector 121A may pertain to more than one attribute (e.g., ethnicity and emotion), however specific patterns of faceprint vector 121A may be identified as corresponding to specific attributes.

Some embodiments of the invention may be configured to exploit or utilize such separation of attributes, so as to produce an anonymized perturbated face 40. This route is marked in FIG. 4 as R3.

For example, encoder 121 may receive a first segmented face 11 (e.g., segmented from image set 10 by segmentation module 110) and a second face from a face repository 50. According to some embodiments, system 100 may select the second face according to labeled facial attributes (e.g., gender, age) that may be similar to those of first segmented face 11 (e.g., according to an attribute classifier 240).

According to some embodiments, encoder 121 may produce a first separated faceprint vector 121A from first segmented face 11 and may produce a second separated faceprint vector 121A from the second face (e.g., of face repository 50).

According to some embodiments, face generation module 120 may include a comparator module 170 and an identity swap 190 module.

Comparator module 170 may be, or may include an ML-based model, trained to identify (or "predict", as commonly referred to in the art) a pattern of elements of faceprint vector 121A, given a specific attribute.

For example, during the training stage, comparator module 170 may receive a plurality of labeled, segmented face 11, where said label may include a value of one or more attributes. In the example of the facial attribute of emotions, said label may be produced by an emotions attribute classifier 310, and may include an indication 310' that a depicted face expresses "happiness", "sadness" or "anger". Comparator module 170 may thus be trained to identify a pattern of elements (e.g., NN nodes) of faceprint vector 121A, corresponding to each such emotion.

According to some embodiments, comparator module 170 may be adapted to compare values of one or more elements (e.g., NN nodes) of a first separated faceprint vector 121A, pertaining to first segmented face 11 with one or more elements (e.g., NN nodes) of second separated faceprint vector 121A, pertaining to the second face originating from face repository 50.

Comparator module 170 may collaborate with identity swap 190 module, which may be configured to change at least one value of an element of first separated faceprint vector 121A. For example, identity swap 190 module may swap at least one value of an element of first separated faceprint vector 121A with a respective at least one value of an element of second separated faceprint vector 121A, according to at least one anonymization requirement 20. For example, if an anonymization requirement states that an expression of a face should be kept but an ethnicity of the face may be changed, then identity swap 190 module may: (a) overwrite one or more values of separated faceprint vector 121A elements of first segmented face 11 that pertain to ethnicity with respective values of second separated faceprint vector 121A elements (e.g., of face repository 50); and (b) refrain from changing values of separated faceprint vector 121A elements of first segmented face 11 that pertain to expression.

According to some embodiments of the invention, face generator 120 may include an ML-based decoder 150 module and an ML-based perturbation module 140. As shown in FIG. 4, decoder 150 module and a perturbation module 140 may be included in yet another route, enumerated as R2 in FIG. 4, for producing a perturbated face 40.

In a training stage, decoder 150 may be trained to reproduce an image of a face from a faceprint vector 121A of NN nodes that may be produced by ML-based encoder 121.

In a subsequent inference stage, ML-based perturbation module may be adapted to produce a difference vector 141A, corresponding to, or having the same dimension as the dimension of the faceprint vector 121A. Embodiments of the invention may modify one or more elements of the faceprint vector 121A according to the difference vector 141A. For example, difference vector 141A may include values to be added to respective one or more (e.g., all) elements (e.g., NN node values) of faceprint vector 121A, so as to generate a modified faceprint vector 121C.

In the inference stage, as depicted in FIG. 4 by route R2, decoder 150 may be configured to generate a perturbated face 40 from the modified faceprint vector 121C. Additionally, or alternatively, as depicted in FIG. 4 by route R3, decoder 150 may be configured to generate a perturbated face 40 from a modified, separated faceprint vector 121A.

As shown in FIG. 4, encoder 121 may be configured to collaborate with GNN 155 (e.g., route R1) and/or with decoder 150 (e.g., route R2). For example, a first encoder 121 may be configured to work with GNN 155, and a second encoder 121 may be configured to work with decoder 150.

Figure 6:
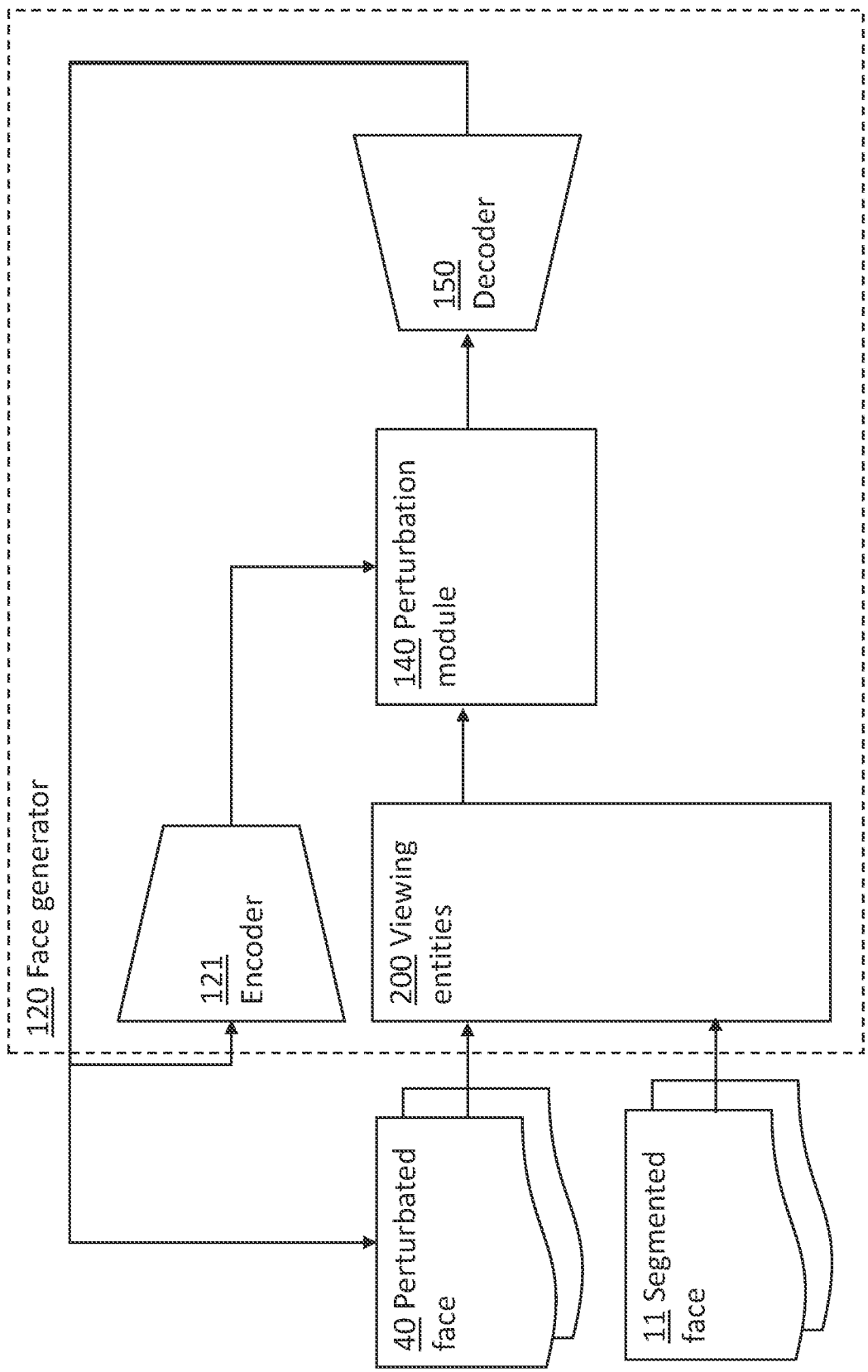
FIG. 6 is a block diagram depicting training of a perturbation module during a training stage of a system for anonymization of an image, according to some embodiments of the invention.

Reference is now made to FIG. 6, which is a block diagram depicting training of a perturbation module during a training stage of a system 100 for anonymization of an image, according to some embodiments.

In some embodiments of the invention, perturbation module 140 may be, or may include one or more ML models and may be trained to accommodate one or more anonymization requirement 20, in a training process that may be supervised by one or more respective viewing entities 200.

For example, an anonymization requirement 20 may dictate that one or more attributes (e.g., age) of segmented face 11 should be maintained or preserved in perturbated face 40 and that perturbated face 40 may not be recognizable as pertaining to the same person depicted in segmented face 11. For example, perturbation module 140 may be trained to minimize a cost function element, as elaborated in the following equation, Eq. 4:

$$\text{Cost} = \alpha \|A_1(I) - A_1(D(P(E(I))))\| + \beta \|A_2(I) - A_2(D(P(E(I))))\| - \gamma \|FR(I) - FR(D(P(E(I))))\| \quad \text{Eq. 4}$$

where:

$FR(\cdot)$ is a numerical indication 200' of a viewing entity 200 such as face recognition classifier 210;

$A_1(\cdot)$ and $A_2(\cdot)$ respectively represent numerical indications 310' of a first attribute classifier 310 (e.g., an expression attribute classifier 310) and a second attribute classifier 310 (e.g., an ethnicity classifier 310);

$\alpha$, $\beta$ and $\gamma$ respectively represent numerical values of weights for each of the attribute classifier indications 310' (e.g., according to one or more anonymization requirements 20) and viewing entity (e.g., FR classifier 210) indication 200';

E(·) represents an output from encoder 121 that may be a faceprint vector 121A; and D(·) represents an output from decoder 150 that may be a perturbated face 40.

In other words, during the training stage, perturbation module 140 may receive: at least one data element pertaining to anonymization requirement 20 (e.g., an attribute that must be preserved) and a training set of faceprint vectors 121A (e.g., faceprint vectors 121A produced by encoder 121 from a training set of segmented faces 11). Perturbation module 140 may be trained on the training set of faceprint vectors 121A to produce a difference vector 141A, using indication 200' from at least one viewing entity 200 and indication 310' from at least one attribute classifier 310 as supervising feedback.

Difference vector 141A may be applied to (e.g., added to) faceprint vector 121A, so as to produce a second, perturbated faceprint vector 121C. Decoder 150 may then use the second, perturbated faceprint vector 121C (e.g., instead of an original faceprint vector 121A), to produce a reconstructed, perturbated face 40. In other words, the feedback (e.g., indications 200' and 310') from at least one viewing entity and from at least one attribute classifier may be used to produce, by decoder 150 a perturbated face 40. The difference vector 141A may be adapted so as to minimize the cost function element (e.g., "Cost" of Eq. 4), and thus ensure that the generated, perturbated face 40 complies with, or corresponds to anonymization requirement 20.

During a subsequent inference stage (e.g., after perturbation module 140 has been trained), perturbation module 140 may receive at least one first data element of an anonymization requirement 20 and receive at least one faceprint vector 121A. Perturbation module 140 may subsequently produce at least one difference vector 141, based on said training, as a function of the anonymization requirement 20 and faceprint vector 141. Perturbation module 140 may apply difference vector 141A on faceprint vector 121A, to produce perturbated faceprint vector 121C, and decoder 150 may then use the second, perturbated faceprint vector 121C to produce perturbated face 40.

According to some embodiments, attribute classifier 310 indications (e.g., 310') and/or viewing entity 200 indications (e.g., 200') may be regarded as classifications of segmented faces 11. For example, a viewing entity (e.g., FR 210) may be or may include a classification model, adapted to classify faces (e.g., segmented faces 11) according to their identity. Therefore indications (e.g., 200') may be regarded as classification, or association of a segmented face to a group of faces pertaining to the same identity (e.g., the same person). In another example, an attribute classifier 310, such as an age attribute classifier 310 may be or may include a classification model, adapted to classify faces (e.g., segmented faces 11) according to their age. Therefore indications (e.g., 310') may be regarded as classification, or association of a segmented face to a group of faces pertaining to the same age.

According to some embodiments, ML-based perturbation model 140 may be trained in an iterative method, to gradually produce a perturbated face 40 that best satisfies anonymization requirement 20. Such embodiments may include, for example:

(a) Providing a first face (e.g., segmented face 11) of a training set as a first input to at least one of the viewing entity 200 and attribute classifier 310, to obtain a first classification (e.g., an indication 200' or 310') of the first segmented face 11;

(b) Producing, by ML-based encoder 121, from the first face, a respective faceprint vector 121A;

(c) Producing, by ML-based decoder 150, from faceprint vector 121A a respective second, perturbated face 40;

(d) Providing the second face as a second input to at least one of the viewing entity 200 and attribute classifier 310, to obtain a second classification (e.g., an indication 200' or 310');

(e) Analyzing, by perturbation module 140 (e.g., by a process of backward propagation) the first classification and second classification in view of the anonymization requirement. Perturbation module 140 may thus ascertain whether attribute indication 310' and/or identity indication 200' indicate that perturbated face 40 satisfies anonymization requirement 20, and/or whether perturbated face 40 is converging towards satisfying anonymization requirement 20;

(f) Modifying difference vector 141A according to the analysis to obtain a modified, perturbated face 40;

(g) Repeating steps (b) through (f) until the anonymization requirement 20 is met; and (h) Repeating steps (a) through (g) with another face (e.g., segmented face 11) of the training set, to train perturbation model 140.

Reference is made back to FIG. 4. As shown in FIG. 4, face generator module 120 may include a landmark module 180 and a warp module 195, which may be adapted to collaborate so as to produce a perturbated face 40 according to one or more anonymization requirements 20. This route is depicted FIG. 4 as route R4.

According to some embodiments of the invention, one or more anonymization requirements 20 may include a requirement to maintain positioning attributes (e.g., position, pose, inclination, orientation, etc. of a face in an image) of the one or more segmented faces 11 in the respectively produced one or more perturbated faces 40.

Landmark module 180 may be configured to receive one or more first faces such as segmented faces 11 and receive one or more second faces, e.g., from face image repository 50. Landmark module 180 may produce at least one point-of-interest, or landmark data element pertaining to a specific location or position of a landmark on one or more (e.g., each) received face (e.g., segmented face 11 and face of image repository 50). For example, the at least one landmark data element may include one or more positions of facial elements such as a position of an eye pupil in the received faces. In this example, landmark module 180 may produce a first landmark, that is a position of a pupil in segmented face 11, and a second landmark, that is a position of a pupil in a face originating from face image repository 50.

According to some embodiments of the invention, warp module 195 may be configured to warp the one or more second face to match the position of the one or more landmarks of the first face. In other words, warp module 195 may be configured to warp the position of the one or more landmarks of the first face, to match the position of the one or more landmarks of the face from repository 50, so as to substantially replace segmented face 11 with the face from repository 50. It will be appreciated that this process may obtain anonymization, while maintaining at least one attribute (e.g., a positioning attribute) of segmented face 11.

Reference is now made to FIG. 7, which is a flow diagram depicting a method of anonymizing a face in a set of images by at least one processor (e.g., element 2 of FIG. 1).

As shown in step S1005, the at least one processor may extract, or segment from a first set of images (e.g., element 10 of FIG. 3, such as one or more still images, a video file, a video stream, and the like) a first face (e.g., element 11 of FIG. 4), depicting a person. It may be appreciated that the extracted face may have, or may be characterized by a first set of attributes, including for example facial attributes, positioning attributes, accessory attributes and the like, as elaborated herein.

As shown in step S1010, the at least one processor may perturbate the first face to produce a second, perturbated face (e.g., element 40 of FIG. 4), having a second set of attributes. As elaborated herein, the second set of attributes (e.g., attributes of perturbated faces 40) may be adapted to be perceived, by an attribute classifier (e.g., element 310 of FIG. 4), as substantially equivalent to the first set of attributes, and the perturbated face 40 may be adapted to be visually perceived by a viewing entity (e.g., element 200 of FIG. 4) as not pertaining to the same depicted person as original image 10.

As elaborated herein (e.g., in relation to FIG. 4), embodiments of the invention may perform said perturbation in a plurality of ways or routes (e.g., elements R1-R4 of FIG. 4), to produce a plurality of perturbated faces 40, and subsequently select an optimal perturbated face 40 from the plurality of perturbated faces 40.

Embodiments of the invention include a practical application for anonymizing a face in an image, e.g., producing an image that depicts an anonymized face. Embodiments may produce the anonymized image by receiving an original image, or set of original images depicting a face, and producing therefrom a perturbated image or set of perturbated images, that are an anonymized version of the original image, or set of original images, but may still maintain one or more features (e.g., facial features) of the original image, or set of original images.

Embodiments of the invention may include an improvement over currently available methods and systems for anonymizing a face by allowing definition of a specific anonymization requirement, dictating a relation of the anonymization process to one or more attributes of the original face, and anonymizing the original images according to the defined anonymization requirement.

In addition, embodiments of the invention may include an improvement over currently available methods and systems for anonymizing a face by performing said anonymization via a plurality of routes, to obtain a plurality of perturbated faces, and subsequently selecting an optimal perturbated face from the plurality of perturbated faces. The term optimal may be used herein in the sense that attributes of the selected perturbated face best fit, or best satisfy the predefined anonymization requirement.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention. Further, features or elements of different embodiments may be used with or combined with other embodiments.

The invention claimed is:

1. A method of anonymizing a face in a set of images by at least one processor, the method comprising:
training a machine-learning (ML) based face generator model comprising a face encoder and a face decoder to reconstruct an input image of a face;
reducing a dimension of the face encoder module to generate a reduced dimension face generator model and retraining the reduced dimension face generator model so that:
an image of a face generated by the reduced dimension face generator model from the input image is visually perceived by a viewing entity as not pertaining to the same person as in the input image, and
attributes of the face in the generated image is perceived by an attribute classifier as substantially equivalent to the attributes of the input image;
repeating reducing and retraining until a predefined encoder dimension limit is reached;
extracting, from a first set of images, a new face depicting a new person and having a first set of attributes; and
using the reduced dimension face generator model to produce an anonymized face from the new face, the anonymized face having a second set of attributes,
wherein the second set of attributes is adapted to be perceived, by the attribute classifier, as substantially equivalent to the first set of attributes, and wherein the anonymized face is adapted to be visually perceived by the viewing entity as not pertaining to the new person.

2. The method of claim 1, wherein the face encoder module comprises a neural network (NN), wherein reducing the dimension of the face encoder module comprises at least on of: omitting at least one node in at least one layer of the NN, omitting at least one layer of the NN or omitting at least one link in the NN.

3. The method of claim 1, wherein the face encoder module comprises a neural network (NN) and wherein the minimal encoder dimension limit is a predefined number of NN nodes.

4. The method of claim 1, further comprising blending a background of the first set of images with the anonymized face to produce a second set of images.

5. The method of claim 1, wherein the viewing entity is selected from a list consisting of: a perceptual similarity metric module, a human vision similarity predictor; a face recognition classifier; and feedback from a human viewer.

6. The method of claim 1, wherein the attributes of the first set of attributes and second set of attributes are selected from a list consisting of: facial attributes, positioning attributes and accessory attributes.

7. The method of claim 6, wherein the facial attributes are selected from a list consisting of: an age, a gender, an ethnicity, an emotion, an expression, a complexion and an eye color, wherein the positioning attributes are selected from a list consisting of: a position of a face, an orientation of a face, a pose of a face, and an elevation of a face, and wherein the accessory attributes are selected from a list consisting of: existence of spectacles on a face, existence of jewelry on the face and existence of hair dressing accessories on the face.

8. The method of claim 1, wherein training the ML-based face generator module comprises:
receiving at least one labeled image of a face, pertaining to the labeled training set of images, as a first input;
receiving at least one output indication of an attribute classifier as a second input; and
receiving at least one output indication of a viewing entity as a third input.

9. The method of claim 1, wherein retraining the reduced dimension face generator model comprises using the already trained face decoder and training the reduced dimension face encoder using a cost function that decreases as a level of similarity between the attributes of the face in the generated image and the attributes of the input image decreases and increases as the level of similarity in identity between the face in the generated image and the face in the input image decreases.

10. The method of claim 1, wherein producing the anonymized face comprises:
  using the face encoder, to produce, from the new face, a faceprint vector having a reduced dimension in relation to the new face; and
  using the face decoder to generate the anonymized face from the faceprint vector, wherein the face decoder comprises a generative neural network (GNN) module.

11. A method of anonymizing a face in a set of images by at least one processor, the method comprising:
  training a machine-learning (ML) based face generator model comprising a face encoder and a generative neural network (GNN) module to reconstruct an input image of a face;
  reducing a dimension of the face encoder module to generate a reduced dimension face generator model and retraining the reduced dimension face generator model so that:
    an image of a face generated by the reduced dimension face generator model from the input image is visually perceived by a viewing entity as not pertaining to the same person as in the input image, and
    attributes of the face in the generated image is perceived by an attribute classifier as substantially equivalent to the attributes of the input image;
  repeating reducing and retraining until a predefined encoder dimension limit is reached;
  extracting, from a first set of images, a new face depicting a new person and having a first set of attributes; and
  using the reduced dimension face generator model to produce an anonymized face from the new face, the anonymized face having a second set of attributes,
  wherein the second set of attributes is adapted to be perceived, by the attribute classifier, as substantially equivalent to the first set of attributes, and wherein the anonymized face is adapted to be visually perceived by the viewing entity as not pertaining to the new person.

12. A system of anonymizing a face in a set of images, comprising:
  a memory; and
  a processor configured to:
    train a machine-learning (ML) based face generator model comprising a face encoder and a face decoder to reconstruct an input image of a face;
    reduce a dimension of the face encoder module to generate a reduced dimension face generator model and retraining the reduced dimension face generator model so that:
      an image of a face generated by the reduced dimension face generator model from the input image is visually perceived by a viewing entity as not pertaining to the same person as in the input image, and
      attributes of the face in the generated image is perceived by an attribute classifier as substantially equivalent to the attributes of the input image;
    repeat reducing and retraining until a predefined encoder dimension limit is reached;
    extract, from a first set of images, a new face depicting a new person and having a first set of attributes; and
    use the reduced dimension face generator model to produce an anonymized face from the new face, the anonymized face having a second set of attributes,
    wherein the second set of attributes is adapted to be perceived, by the attribute classifier, as substantially equivalent to the first set of attributes, and wherein the anonymized face is adapted to be visually perceived by the viewing entity as not pertaining to the new person.

13. The system of claim 12, wherein the face encoder module comprises a neural network (NN), wherein the processor is configured to reduce the dimension of the face encoder module by performing at least one of: omitting at least one node in at least one layer of the NN, omitting at least one layer of the NN or omitting at least one link in the NN.

14. The system of claim 12, wherein the processor is configured to blend a background of the first set of images with the anonymized face to produce a second set of images.

15. The system of claim 12, wherein the attributes of the first set of attributes and second set of attributes are selected from a list consisting of: facial attributes, positioning attributes and accessory attributes, wherein the facial attributes are selected from a list consisting of: an age, a gender, an ethnicity, an emotion, an expression, a complexion and an eye color, wherein the positioning attributes are selected from a list consisting of: a position of a face, an orientation of a face, a pose of a face, and an elevation of a face, and wherein the accessory attributes are selected from a list consisting of: existence of spectacles on a face, existence of jewelry on the face and existence of hair dressing accessories on the face.

16. The system of claim 12, wherein the processor is configured to train the ML-based face generator module by:
  receiving at least one labeled image of a face, pertaining to the labeled training set of images, as a first input;
  receiving at least one output indication of an attribute classifier as a second input; and
  receiving at least one output indication of a viewing entity as a third input.

17. The system of claim 12, wherein the processor is configured to retrain the reduced dimension face generator model by using the already trained face decoder and training the reduced dimension face encoder using a cost function that decreases as a level of dissimilarity between the attributes of the face in the generated image and the attributes of the input image decreases and increases as the level of dissimilarity in identity between the face in the generated image and the face in the input image decreases.

18. The system of claim 12, wherein the processor is configured to produce the anonymized face by:
  using the face encoder, to produce, from the new face, a faceprint vector having a reduced dimension in relation to the new face; and
  using the face decoder to generate the anonymized face from the faceprint vector, wherein the face decoder comprises a generative neural network (GNN) module.

\* \* \* \* \*